United States Patent [19]

Knuth et al.

[11] Patent Number: 4,463,746
[45] Date of Patent: Aug. 7, 1984

[54] PORTABLE BARBECUE GRILL

[75] Inventors: Henry A. Knuth; Virgil W. Daily, III, both of Paris, Ill.

[73] Assignee: UNR Industries, Inc., Chicago, Ill.

[21] Appl. No.: 409,035

[22] Filed: Aug. 18, 1982

[51] Int. Cl.³ .......................... F24B 7/04; A47J 37/00
[52] U.S. Cl. .................................. 126/25 R; 126/9 R; 126/275 R; 220/293
[58] Field of Search ............. 126/25 R, 25 A, 25 AA, 126/29, 30, 9 R, 9 A, 9 B, 1 R, 275 R; 220/4 B, 293

[56] References Cited

U.S. PATENT DOCUMENTS

| | | | |
|---|---|---|---|
| 1,596,367 | 8/1926 | Miller | 220/293 |
| 2,641,243 | 6/1953 | Goss | 126/25 R |
| 3,611,910 | 10/1971 | Hughes | 220/293 |
| 3,791,368 | 2/1974 | Hunt | 126/25 A |
| 3,812,840 | 5/1974 | Whaler | 126/25 R |

FOREIGN PATENT DOCUMENTS

| | | | |
|---|---|---|---|
| 30376 | 6/1963 | German Democratic Rep. | 220/293 |
| 1024469 | 3/1966 | United Kingdom | 220/293 |

*Primary Examiner*—James C. Yeung
*Attorney, Agent, or Firm*—Clement and Ryan

[57] ABSTRACT

An easily and conveniently portable barbecue grill in which the bowl has an outwardly and upwardly extending flange around its perimeter and the lid has an outwardly extending flange around its perimeter, which flanges cooperate to produce a secure attachment between the lid and the bowl when the lid is placed on the bowl in a certain way. In the preferred embodiment, the bowl flange has two or more indentations equally spaced around its perimeter to form a number of inwardly facing reentrant portions on that flange, and the lid flange has at least one gap in its perimeter. The lid may be securely attached to the bowl by (1) first positioning the lid with a full flange portion nested beneath an inwardly facing reentrant portion on the bowl flange and, as an example, a single gap on the lid flange positioned to span a reentrant bowl flange portion directly opposite, and (2) then rotating the lid a short angular distance to bring solid portions of the lid flange into nested positions under all the inwardly facing reentrant portions of the bowl flange. Although securely attached, the lid is seated loosely in the bowl flange when attached to the bowl in this way, and perimeter venting results because the construction of the grill means that supports foodstuffs to be cooked leaves ventilation spaces around the perimeter of the lid. With perimeter venting, vent openings may be omitted from the bowl and the bowl itself may then serve as an ash catcher. The bowl flange serves as a lip guard against accidental spattering or dripping of grease.

13 Claims, 13 Drawing Figures

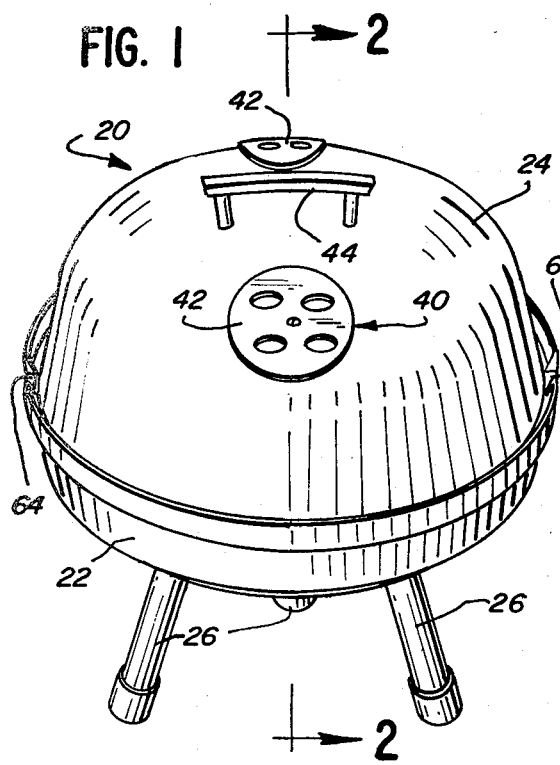
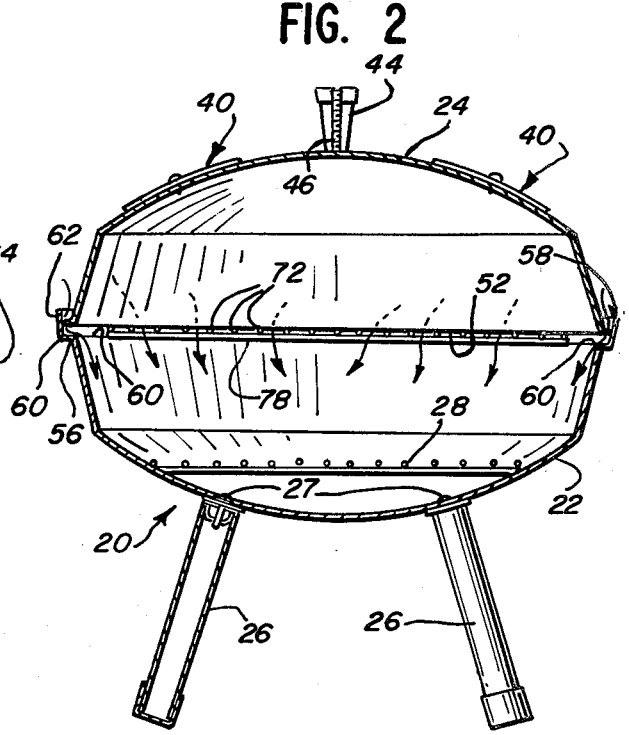
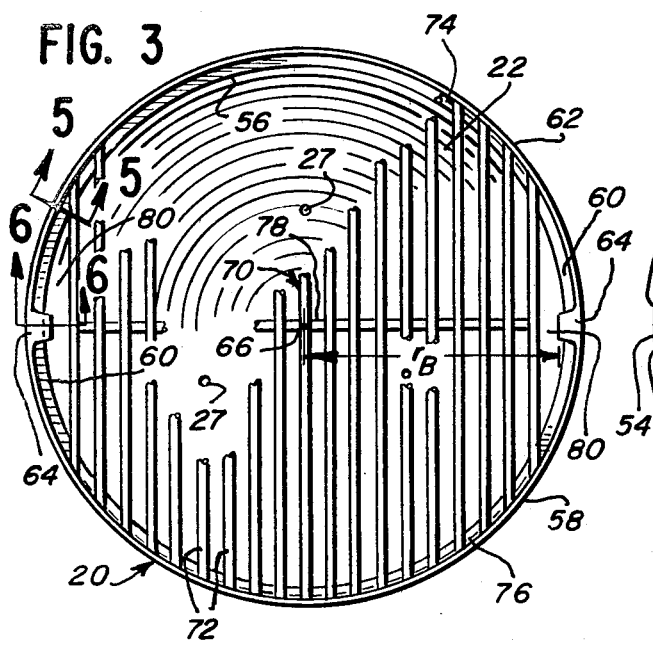
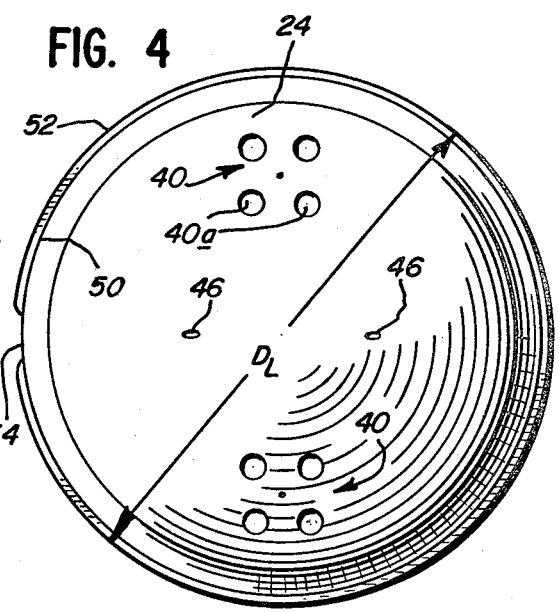
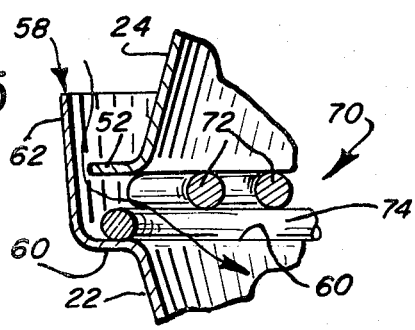
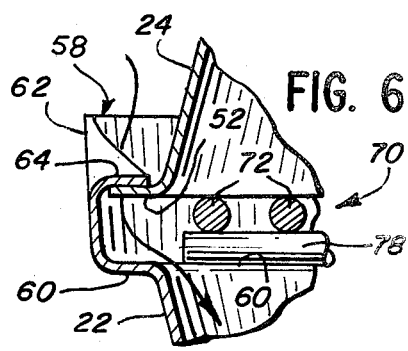

4,463,746

PORTABLE BARBECUE GRILL

FIELD OF INVENTION

This invention relates to a barbecue grill, and in particular to such a grill that is easily and conveniently portable.

BACKGROUND OF THE INVENTION

Most barbecue grills for backyard or other outdoor use today have a certain degree of portability. However, so far as applicant is aware, none of these prior art grills provides the ultimate in portability—that is, a grill that can be carried by use of one hand only—as conveniently as is done by the present invention. Such portability is particularly desirable for small grills designed primarily for beach and picnic ground use.

A barbecue grill such as the grill of the present invention can be easily and conveniently carried from the automobile truck or van to the location of its use. It can be easily and conveniently carried back to the automobile or van. And, to an extent not heretofore possible, it can be easily and conveniently moved from one location to another location that is more desirable—because of changed wind conditions or any other reason—after the grill has been set up in position for use but before the charcoal or other fuel has been lit.

SUMMARY OF THE INVENTION

In the barbecue grill of this invention, the bowl member has an outwardly and upwardly extending flange around its circular perimeter, and the lid member likewise has an outwardly extending flange around its perimeter. The flange on one of these members has a plurality of indentations equally spaced around its perimeter to form a number of inwardly facing reentrant portions on that flange.

The second flange has at least one gap in its perimeter and may have a plurality of such gaps. If a plurality of gaps is used, they are arranged with the same spacing as the reentrant portions on the first flange. Each such gap is of a size and shape to accept one of the reentrant flange portions on the other member.

Whether a single gap or a plurality of gaps is used, a secure attachment of the bowl and lid is provided easily and conveniently by positioning the lid on the bowl in a prescribed way. If two opposed indentations and a single gap are used, for example, the full flange portion opposite the gap is first nested beneath one of the inwardly facing reentrant flange portions and the gap is positioned to span the other reentrant flange portion. When more than two reentrant flange portions is employed, the same number of gaps must also be employed, and the lid is aligned so that each gap spans an inwardly facing reentrant flange portion.

In either case, after the gap and reentrant portion alignment just described is effected, a secure attachment of bowl and lid is achieved by rotating the lid a short angular distance—which in the case of a plurality of gaps is less than the angular distance separating adjacent gaps—upon the bowl. This brings solid portions of one flange to nest under all the inwardly facing reentrant portions of the other flange.

The reentrant flange portions are preferably on the flange of the bowl member. They are preferably two in number, but may be more if desired. A preferred form for the flange on the bowl perimeter includes a generally horizontal wall and a generally vertical wall that together form a protective lip against accidental spattering or dripping of grease when fatty or greasy foodstuffs are being cooked in the barbecue grill.

The diameter of the member having a flange with one or more gaps must be small enough that the member can fit within the flange in the other member, and large enough to avoid slipping out of its nested relationship with the reentrant portions of the flange on the other member after it has been placed in that nested relationship.

With the lid secured to the bowl member in the manner described, a grill of the small size generally employed on a beach or picnic ground can readily be lifted by a single handle at the center of the lid, and carried from one location to another either before or after the grill has been set up in position for use.

BRIEF DESCRIPTION OF THE DRAWING

In the accompanying drawing:

FIG. 1 is a perspective view of one embodiment of the portable barbecue grill of this invention;

FIG. 2 is a sectional view of the portable barbecue grill of FIG. 1 taken along line 2—2 in that Figure;

FIG. 3 is a top plan view of the portable barbecue grill of FIG. 1 with the lid and charcoal grate removed and the grill means for supporting foodstuffs broken away;

FIG. 4 is a bottom plan view of the lid of the portable barbecue grill of FIG. 1;

FIG. 5 is a fragmentary sectional view of the portable barbecue grill of FIG. 3, taken along line 5—5 in the latter Figure, with the lid added;

FIG. 6 is a fragmentary sectional view of the portable barbecue grill of FIG. 3, taken along line 6—6 in the latter Figure, with the lid added;

DETAILED DESCRIPTION OF ONE EMBODIMENT OF THE INVENTION

Figure 7:
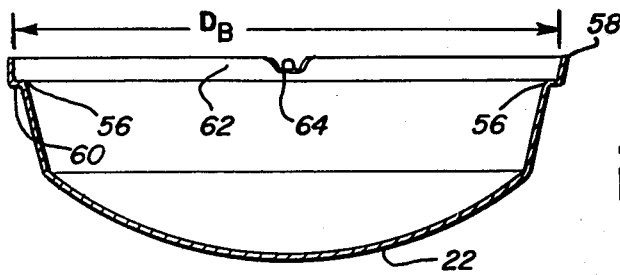
FIG. 7 is a sectional view of the bowl member of the portable barbecue grill of FIG. 1, taken along line 2—2 in the latter Figure.

One embodiment of the portable barbecue grill of this invention will now be described in detail, by reference to the accompanying drawings.

General Construction

FIG. 1 is a perspective view of portable barbecue grill 20 comprised of bowl member 22 and lid member 24. Three legs 26 are equally spaced around bowl 22 to provide supporting means for the bowl. As best seen in FIGS. 2 and 3, legs 26 may be removed, if it is desired to disassemble the grill for storage or transport, by removing bolts 27.

The short legs shown in FIG. 2 are very advantageous when the barbecue grill is used in an elevated position on a picnic table, or is used on an uneven surface such as a sandy or rocky beach where a low center of gravity will produce greater stability for the grill. The same stability is provided, of course, when the grill is to be used on a patio or a relatively even grassy plot.

FIG. 2 provides a sectional view of barbecue grill 20 taken along the line 2—2 in FIG. 1. As is seen from FIG. 2, means for heating foodstuffs to be cooked—in this embodiment, a grate 28 for supporting burning charcoal briquettes—is positioned within bowl member 20, resting on the bottom wall of the bowl.

Figure 13:
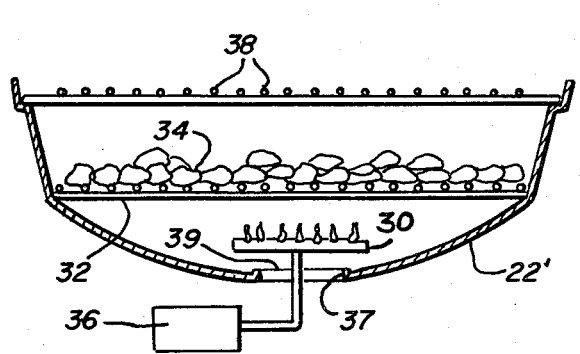
FIG. 13 is a fragmentary cross-sectional view of another embodiment of the portable barbecue grill of this invention in which the heat for cooking is supplied by a gas burner.

As indicated in FIG. 13, in place of grate 28 for supporting charcoal briquettes the heating means may comprise a gas burner 30 and, if desired, grate means 32 for supporting a quantity of lava rock 34. In use, the gas burner is supplied with heating gas from a reservoir 36 of, for example, liquid propane (shown diagrammatically).

Air to provide oxygen for combustion of the gas is admitted through inlet opening 37 in the bottom of bowl 22', with primary air passing through a venturi tube (not shown) positioned in the center of opening 37, and secondary air entering through the remainder of the opening. The exhaust gases exit from the grill from around the perimeter of lid 24, and no exhaust vents are provided in the lid. Circular air inlet opening 37 is provided with upwardly extending flange 39 around its circumference.

The flames from burner 30 heat any lava rocks 34 that are used, which in turn provide heat by both radiation and convection to cook whatever foodstuffs are supported on food grill 38 above the rocks.

The Lid

Lid member 24 is shown in section in FIG. 2 and in bottom plan view in FIG. 4. The lid has at least one adjustable vent 40, each of which vents comprises a plurality of apertures 40a and a rotatable apertured cover 42.

Handle 44 extends upward from the center of the lid secured by a pair of bolts 46. This handle, symmetrically placed above the center of the lid, provides a convenient purchase for lifting the lid.

The Bowl

Bowl member 22 has a circular upper perimeter 56 and outwardly and upwardly extending circular flange 58 around that perimeter. Circular flange 58 is comprised of a generally horizontally disposed wall portion 60 and a generally vertically disposed wall portion 62. Elements 60 and 62 form a protective lip against accidental spattering of grease from foodstuffs being cooked on the grill, and against the dripping on the patio or ground of condensed grease or oils that may accumulate on the inside surface of the lid and from there flow down off the lid and in the absence of the protective lip fall down from the grill.

Two or more indentations 64 are equally spaced (in FIGS. 1 and 3, at 180°) around circular perimeter 56 of bowl 22. Each indentation forms an inwardly facing reentrant portion of circular flange 58. Each gap 54 referred to above is of a size and shape to accept an inwardly facing reentrant flange portion 64.

As stated above, if desired, a plurality of such gaps 54 may be employed. When a plurality of gaps is present, they are equally spaced around circular flange 52, with the same spacing as the spacing of inwardly facing reentrant portions 64 of bowl flange 58.

The relative dimensions of lid 24 and bowl 22 are important. The diameter $D_L$ of flange 52 on lid member 24 (FIGS. 4 and 8) must be smaller than inner diameter $D_B$ of flange 58 on bowl member 22 (FIG. 7) so that it can fit into the later flange and provide a loose fit therewith, both horizontally and vertically. In addition, diameter $D_L$ must be substantially larger than twice the distance $r_B$ between the geometric center 66 of flange 58 on bowl 22 and any of inwardly facing reentrant flange portions 64 (FIG. 3), in order to produce the secure locking of lid 24 on bowl 22 that is now to be described.

Lid Securing Means

Figure 8:
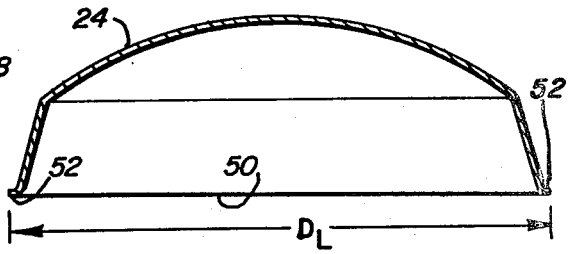
FIG. 8 is a sectional view of the lid member of the portable barbecue grill of FIG. 1, taken along line 2—2 in the latter Figure.
Figure 9:
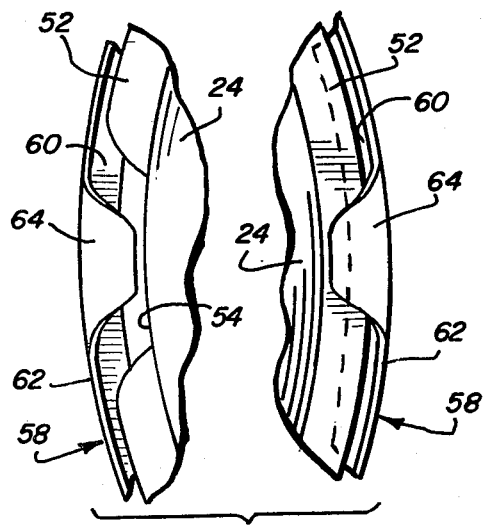
FIG. 9 is a fragmentary plan view of the portable barbecue grill of FIG. 1 showing a pair of opposed reentrant portions of the bowl, with the lid flange having a gap that has been lined up with one of said reentrant flange portions on the bowl after the opposite side of the lid flange has been nested beneath the other of said pair of reentrant flange portions on the bowl.
Figure 10:
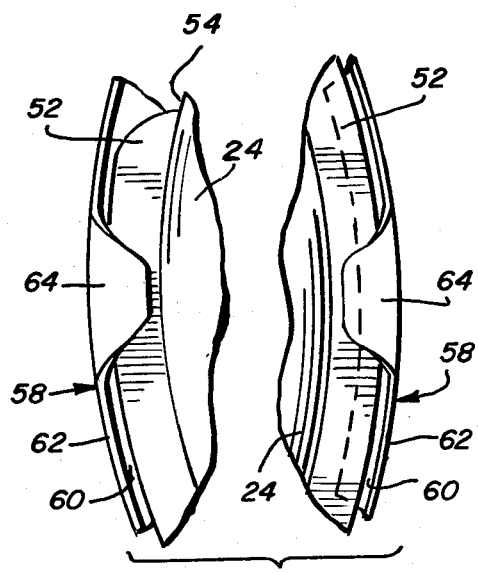
FIG. 10 is a fragmentary plan view of the same bowl and lid as shown in FIG. 9 after the lid has been rotated a short distance to move the lid flange gap away from the bowl member reentrant flange portion on the left-hand side of FIG. 9.

Bowl 22 and lid 24, shown in cross-section in FIGS. 7 and 8, may be securely attached by a procedure, illustrated in FIGS. 6 and 9–10, that produces what may be characterized as a "lock-top" attachment.

A portion of outwardly extending circular flange 52 and lid 24 is first nested under one of the plurality of inwardly facing reentrant flange portions 64 of flange 58 on bowl 22, as shown in the right-hand portion of FIG. 9. At this time, lid 24 is oriented in a position in which gap 54 in circular lid flange 52 is lined up with another inwardly facing reentrant flange portion 64, and the latter reentrant flange portion is seated in the gap by lowering lid 24 until its circular flange 52 is seated within circular flange 58 of bowl 22.

Lid 24 is thereafter turned a short angular distance, to the position shown in FIG. 10 or somewhat farther. In this position, solid portions of circular flange 52 of lid 24 are nested below both inwardly facing reentrant flange portions 64 of bowl 22, as shown in FIGS. 6 and 10.

When more than one gap 54 is present in flange 52 of lid 24, the angular distance that lid 24 is turned to secure it to bowl 22 is anything less than the angular distance separating adjacent gaps 54.

In the embodiment of FIGS. 1–10, in which there are two reentrant flange portions 64 and a single gap 54, the angular distance through which lid 24 is turned to lock it onto bowl 22 may be any distance substantially less than one-half turn.

When more than two reentrant flange portions 64 are employed and therefore the same number of gaps 54 must be present, the seating of lid 24 within flange 52 of bowl 22 prior to rotation of the lid to produce a "lock-top" attachment between the bowl and lid is accomplished, as mentioned above, by first aligning the lid so that each gap spans an inwardly facing reentrant flange portion. This alignment is possible because whenever a plurality of gaps 54 is used in flange 52 of lid 24, they are arranged with the same spacing as reentrant flange portions 64 on bowl 22.

It is preferred that the reentrant flange portions described be on the bowl member of the barbecue grill, with the gap or gap portions located on the flange of the lid member, as illustrated in the drawing and described above in this specification. However, the locations of the reentrant flanges on the one hand and the gap or gaps on the other may, if desired, be reversed.

Portability

As will be seen, when lid 24 is securely attached to bowl 22 with flange 52 of the lid nested under inwardly facing reentrant flange portions 64, the user of the barbecue grill can grasp handle 44 and easily and conveniently lift the grill to move it to a new location. If two handles are mounted on lid 24 symmetrically positioned above the geometric center of the lid, this will also provide a purchase for lifting the lid and the grill along with it to move it from one location to another.

A single handle such as member 44 is preferable, because of the ease and convenience it provides when it is desired to move the grill. As indicated above, this may be when the grill is carried from or to an automobile truck or van, or when it is desired to move it from one location to another. It is even possible to move the grill in this way by grasping handle 44 with lid 24 securely attached to bowl 22 when the grill has already been put in position for use and is filled with charcoal or other fuel but before the fuel has been lit and has started to burn. A portable barbecue grill constructed according to this invention is most useful, of course, when the grill is of a relatively small size.

The "lock-top" feature described not only makes possible easy and convenient portability of the barbecue grill, but insures against accidental dislodging of lid 24 from bowl 22 during use of the grill.

Perimeter Venting

Figure 11:
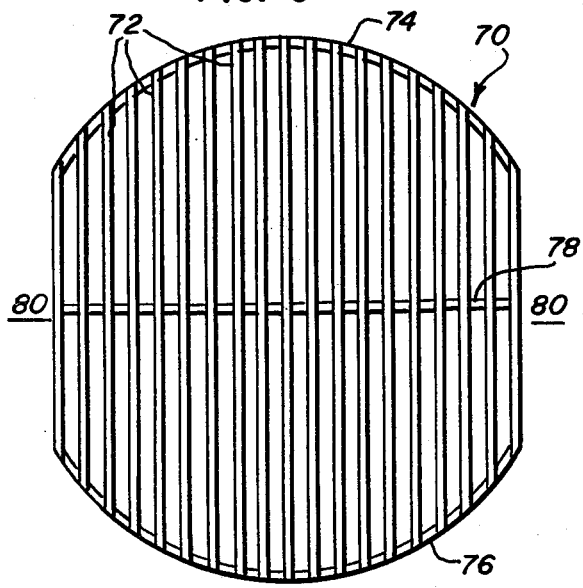
FIG. 11 is a plan view of the grill means for supporting foodstuffs in the portable barbecue grill of FIG. 1.
Figure 12:
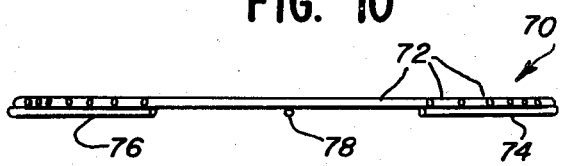
FIG. 12 is a side elevation view of the foodstuff-supporting grill means of FIG. 11 taken from the right-hand side of the latter Figure.

Grill 70 for supporting foodstuffs to be cooked on barbecue grill 20 is shown in FIG. 2 in section, FIG. 3 in partial plan view, and FIG. 11 in full plan view. Grill 70 is comprised of an array of parallel cross wires 72 welded to curved perimeter wires 74 and 76 and to cross support wire 78.

In place in barbecue grill 20, grill means 70 rests upon horizontally disposed bowl flange 60. Specifically, as best seen in FIG. 5, curved perimeter wire 74 rests directly upon bowl flange 60, and it will be understood that curved perimeter wire 76 rests directly upon the same flange on the opposite side of the bowl. As seen in FIGS. 2, 5 and 6, when lid 24 is in place on bowl 22, outwardly extending flange 52 of the lid rests upon the array of parallel cross wires 72.

Admission of exterior air into barbecue grill 20 takes place through perimeter venting around the external edge of flange 52 on lid 24. As indicated by the arrows representing air flow at the left-hand and right-hand sides of FIG. 2 and in FIGS. 5 and 6, substantial ventilation spaces are provided at the outer perimeter of grill 70 between lid 24 and flange 58 of bowl 22. Surprisingly, it has been found that this perimeter venting provides sufficient air to maintain sufficient burning of charcoal or other fuel supported on grate 28, without the necessity of introducing any air directly through vents in the bottom of bowl 22.

The absence of any vent openings in the bottom of bowl 22 makes it possible for the bowl bottom to serve as an ash catcher. This eliminates the necessity of a special element for this purpose, whether located in the interior or on the exterior of the barbecue grill. It also eliminates the step of dumping ashes from either an internal or an external ash catcher, both of which unavoidably involve a certain amount of inconvenience. Because the portable barbecue grill of this invention is relatively small in size, when it becomes necessary to dump the ashes that have accumulated in the bottom of bowl 22, this can easily be done by carrying the entire grill by handle 44, in the manner described above, to a convenient location for discarding the ashes.

The fact that bowl 22 is solid throughout and contains no vents to be opened to admit air into the bowl has another advantage. The absence of vent openings in the bowl means that no grease can drip out of the grill and no ashes or burning embers can fall out accidentally, both of which undesirable results can sometimes occur with a conventional bowl having bottom vents.

As best seen in FIGS. 3 and 11, the ventilation spaces provided at the perimeter of barbecue grill 20 in the manner just described are supplemented by further ventilation spaces resulting from the use of a pair of curved support wires 74 and 76 that are separated by spaces 80 on opposite side of grill 20. Spaces 80 also facilitate insertion of grill 70 in bowl 22 beneath reentrant flange portions 64.

As already inidcated, barbecue grill 20 illustrated in FIGS. 1, 2 and 4 is typically used with charcoal as the fuel for heating the foodstuffs being cooked. When gas is the fuel used with the barbecue grill of this invention, there are two differences in the operation of the grill. First, as pointed out above, air is admitted into the bowl for combustion of the gas through air inlet opening 37 in the bottom of the bowl, and is therefore not admitted through the perimeter ventilation spaces that have been described above. Second, these ventilation spaces serve as exhaust outlets for heated air and exhaust gases that rise from the gas burner instead of as air inlet openings as they do in the case of charcoal grills.

From the description given above of the portable barbecue grill of this invention, it will be seen that this grill has three important and unexpected advantages:

1. The "lock-top" attachment of the lid to the bowl produces a high degree of stability for the assembled grill, and easy and convenient portability.

2. The perimeter venting around the edge of the lid makes it possible to eliminate vents in the bowl, use the resulting fully solid bowl as its own ash catcher, and eliminate a special ash catcher member.

3. The outwardly and upwardly extending flange on the grill bowl provides a lip guard that protects against accidental spattering or dripping of grease, in the manner described above, from foodstuffs being cooked on the grill.

The above detailed description of this invention has been given for use of understanding only. No unnecessary limitations are to be understood therefrom, since modifications will be obvious to those skilled in the art.

We claim:

1. A portable barbecue grill which comprises:
   (a) a bowl member having a circular upper perimeter and having an outwardly and upwardly extending circular flange around said perimeter;
   (b) means for supporting said bowl member;
   (c) means positioned within said bowl member for use in heating foodstuffs to be cooked on said barbecue grill;

(d) grill means positioned within said bowl member above said last mentioned means for supporting said foodstuffs to be cooked; and (e) a lid member having a circular bottom perimeter, and an outwardly extending circular flange around said perimeter, said lid member carrying handle means providing a purchase for lifting said lid that is symmetrically placed above the geometric center of the lid, and for carrying the entire barbecue grill when said lid is secured in place on said bowl member, one of said circular flanges on said bowl member and said lid member having a plurality of indentations of substantially equal size and shape that are equally spaced around its perimeter to form an inwardly facing reentrant portion of said one flange at each such indentation, the other of said two circular flanges (i) having a diameter smaller than the inner diameter of said one, indentation-bearing flange, and substantially larger than twice the distance between the geometric center of said one flange and any of its said inwardly facing reentrant portions, and (ii) having at least one gap in its said perimeter, each of said gaps being of a size and shape to accept one of said reentrant flange portions, and all said gaps, when a plurality of gaps is present, being equally spaced around said other flange with the same spacing as the spacing of said reentrant flange portions, said lid member fitting loosely, both horizontally and vertically, within said bowl member flange when said lid is secured to said bowl, to provide a secure attachment of said bowl and lid when each of said gaps has one of said reentrant flange portions seated therein and all the other of said reentrant flange portions overlie said other circular flange, and the lid is thereafter turned a short angular distance so that solid portions of said other circular flange nest under all said inwardly facing reentrant portions of said one circular flange, and at the same time provide communication, around the perimeter of said lid member, between the exterior space around the barbecue grill and the interior of the grill.

2. The portable barbecue grill of claim 1 in which said lid member carries a single handle located at the center thereof.

3. The portable barbecue grill of claim 1 in which said means to be used in heating foodstuffs to be cooked includes grate means positioned within said bowl member for supporting pieces of solid fuel and said lid member includes at least one adjustable exhaust vent therein.

4. The portable barbecue grill of claim 1 in which said reentrant flange portions are located on said bowl member and said at least one gap is located on said lid flange.

5. The portable barbecue grill of claim 4 in which said flange on said bowl member includes a generally horizontally disposed wall portion and a generally vertically disposed wall portion, which together form a protective lip against accidental spattering or dripping of grease from foodstuffs being cooked on said barbecue grill.

6. The portable barbecue grill of claim 1 for use with charcoal or other solid fuel in which the bottom of said bowl member is without vent openings for the admission of air into the bowl and said lid member fits loosely, both horizontally and vertically, within said bowl member flange when said lid is secured to said bowl.

7. The portable barbecue grill of claim 6 in which said grill means for supporting foodstuffs rests upon said bowl member flange.

8. The portable barbecue grill of claim 7 in which said lid member when in place upon said bowl member rests upon said grill means.

9. The portable barbecue grill of claim 8 in which substantial ventilation spaces are provided at the outer perimeter of said grill means between said lid member flange and said bowl member flange.

10. The portable grill of claim 9 in which said grill means for supporting foodstuffs comprises an array of spaced parallel wires secured to at least one curved support wire at the perimeter of said array positioned at a different level from said array, and said lid rests upon said grill means to provide said ventilation spaces at the outer perimeter of the barbecue grill.

11. The portable grill of claim 10 in which two curved support wires are employed, with gaps of substantial extent between them.

12. A portable barbecue grill which comprises:

(a) a bowl member having a circular upper perimeter and having an outwardly and upwardly extending circular flange around said perimeter, said flange including a generally horizontally disposed wall portion and a generally vertically disposed wall portion which together form a protective lip against accidental spattering or dripping of grease, said flange having a plurality of indentations of substantially equal size and shape that are equally spaced around its perimeter to form an inwardly facing reentrant portion of said flange at each said indentation;

(b) three legs equally spaced around said bowl member for supporting the same;

(c) means positioned within said bowl member for use in heating foodstuffs being cooked on said barbecue grill;

(d) grill means positioned within said bowl member above said last mentioned means for supporting foodstuff to be cooked;

(e) a lid member having an adjustable vent therein, a circular bottom perimeter, and an outwardly extending circular bottom flange around said perimeter, said lid member carrying a single handle extending upward from the center thereof to provide a purchase for lifting said lid that is symmetrically placed above the geometric center of the lid, and for carrying the entire barbecue grill when said lid is secured in place on said bowl member, said lid member having at least one gap in its outwardly extending circular flange, each of said gaps being of a size and shape to accept one of said reentrant flange portions, all said gaps, when a plurality of gaps is present, being equally spaced around said flange with the same spacing as the spacing of said reentrant flange portions on said bowl flange, the diameter of said circular flange on said lid member being smaller that the inner diameter of said circular flange on said bowl member and substantially larger than twice the distance between the geometric center of the latter flange and any of its said inwardly facing reentrant portions, to provide a secure attachment of said bowl and lid when each of said gaps has one of said inwardly facing reentrant flange portions seated therein and all the other reentrant flange portions overlie said lid circular flange, and the lid is thereafter turned a short angular distance so that solid portions of said circular lid flange nest under all said inwardly facing reentrant portions of said circular bowl flange, said bowl member being entirely without vent openings for the admission of air into the bowl, and said lid member fitting loosely, both horizontally and vertically, within said bowl member flange when the lid is secured to the bowl, said grill means for supporting foodstuffs comprising a grill of wires in which substantial ventilation spaces are provided between said wires at the outer perimeter thereof, and said grill means rests upon said bowl member flange with said lid member in turn resting upon said outer perimeter of said foodstuff-supporting grill means.

13. The portable barbecue grill of claim 6 in which the entire bowl member is free of vent openings for the admission of air into the bowl.

* * * * *